US009211681B2

(12) United States Patent
Holland et al.

(10) Patent No.: US 9,211,681 B2
(45) Date of Patent: Dec. 15, 2015

(54) FIBER BASED LASER COMBINERS

(71) Applicant: OFS Fitel, LLC, Norcross, GA (US)

(72) Inventors: William R Holland, Upper Black Eddy, PA (US); Thierry F Taunay, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 24 days.

(21) Appl. No.: 13/912,714

(22) Filed: Jun. 7, 2013

(65) Prior Publication Data
US 2013/0273240 A1 Oct. 17, 2013

Related U.S. Application Data

(63) Continuation-in-part of application No. 12/760,547, filed on Apr. 14, 2010, now Pat. No. 8,472,765.

(51) Int. Cl.
| | |
|---|---|
| *G02B 6/26* | (2006.01) |
| *B29D 11/00* | (2006.01) |
| *G02B 6/28* | (2006.01) |
| *G02B 6/255* | (2006.01) |
| *H01S 3/067* | (2006.01) |
| *H01S 3/16* | (2006.01) |
| *H01S 3/23* | (2006.01) |
| *H01S 3/094* | (2006.01) |

(52) U.S. Cl.
CPC .......... *B29D 11/00663* (2013.01); *G02B 6/262* (2013.01); *G02B 6/2804* (2013.01); *G02B 6/255* (2013.01); *H01S 3/067* (2013.01); *H01S 3/094007* (2013.01); *H01S 3/094019* (2013.01); *H01S 3/1618* (2013.01); *H01S 3/2383* (2013.01)

(58) Field of Classification Search
CPC ...... G02B 6/255; G02B 6/262; G02B 6/2804; G02B 6/2821
See application file for complete search history.

(56) References Cited

U.S. PATENT DOCUMENTS

| | | | |
|---|---|---|---|
| 4,076,378 A | 2/1978 | Cole | |
| 5,864,644 A * | 1/1999 | DiGiovanni et al. | 385/43 |
| 7,046,890 B2 * | 5/2006 | Sparks | 385/127 |
| 2007/0003196 A1 * | 1/2007 | Holcomb et al. | 385/115 |

* cited by examiner

*Primary Examiner* — Eric Wong
*Assistant Examiner* — Mary El Shammaa

(57) ABSTRACT

Embodiments of the present invention generally relate to laser combiners, and more specifically, to all-fiber devices that combine optical laser power from multiple separate sources such as lasers or amplifiers. In one embodiment, a method of manufacturing a combiner device comprises: positioning an plurality of fibers into a bundle of fibers; drawing the bundle of fibers to create a tapered section, the tapered section having a first outer diameter at an input end, a second outer diameter at an output end, and a taper ratio of at least three; wherein at least one of the fibers of the bundle of fibers comprises an optical waveguide configured for propagating an optical mode from the input end to the output end, and wherein a mode field diameter of the optical mode at the input end is substantially the same as the mode field diameter at the output end.

16 Claims, 7 Drawing Sheets

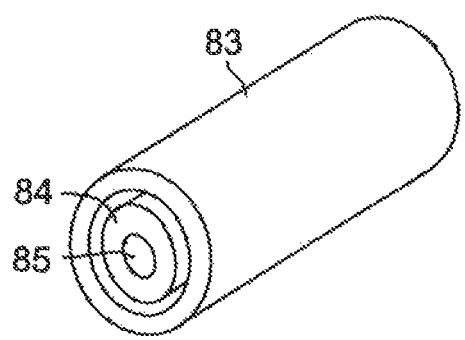
FIG. 8
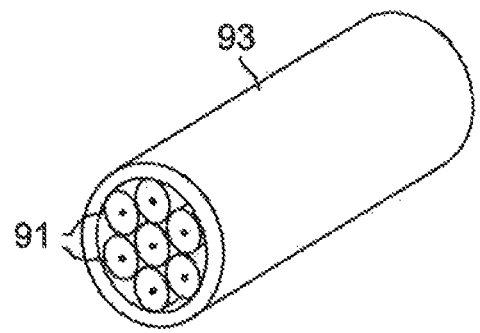
FIG. 9
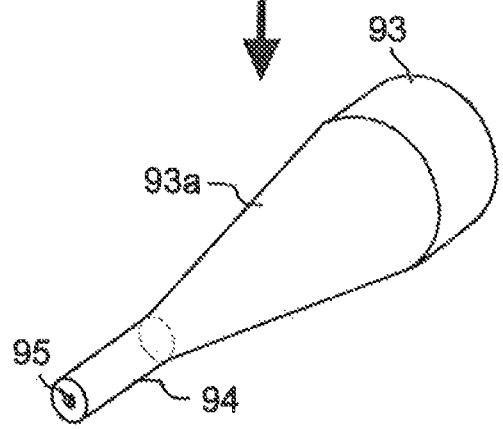

FIBER BASED LASER COMBINERS

CROSS-REFERENCE TO RELATED APPLICATIONS

This application is a continuation application of U.S. patent application Ser. No. 12/760,547, filed Apr. 14, 2010, entitled "Fiber Based Laser Combiner," which claims the benefit of Provisional Application Ser. No. 61/168,952, filed Apr. 14, 2009, the respective disclosures of which are incorporated herein by reference in their entireties.

BACKGROUND OF THE INVENTION

1. Field of the Invention

Embodiments of the present invention generally relate to laser combiners, and more specifically, to all-fiber devices that combine optical laser power from multiple separate sources such as lasers or amplifiers.

2. Description of Related Art

In applications involving high power industrial lasers, fiber-based systems are increasingly attractive. Typically constructed from Ytterbium-doped gain fibers emitting in the 1060 nm wavelength band, fiber lasers with single-moded beam quality are limited to powers in the 200 to few kW range. For certain applications such as cutting and welding of metals, higher levels into the multi-kW range are needed. Currently, this high power is obtained by combining the power from several aforementioned laser fibers into a single fiber, which necessarily exhibits multimoded properties due to the incoherence derived from the separate sources. Still, this technique has been successful in coupling 1-10 kWs of power into a 50-100 um core fiber with numerical aperture less than or equal to 0.22 NA. In many material processing situations, it is desirable for the beam to be multimoded rather than singlemode since a multimode beam can have a more uniform spatial intensity profile.

To perform beam combining, current techniques invoke bulk optical lenses to collimate the fiber inputs and steering mirrors to direct multiple beams into a common fiber core. As can be expected, issues occur when trying to use coated glass components and moving mechanical systems with high powers. These details can create prohibitive cost and maintenance problems.

An all-fiber approach would alleviate these problems, since it is a sealed unit device with no internal moving parts and does not require adjustment or alignment. While multiple fibers can be bundled together and coupled to an output fiber with a large, multimode core, the packing density of the cores in the bundle is typically very low. For example, in a typical singlemode fiber, the core covers less than 1% of the total fiber cross-section. Bundling such fibers will result in significant reduction in the brightness of the optical source when coupled into the common output fiber. While tapering of the fiber bundle will reduce the separation between cores and increase the packing density, there is a limit to the degree of tapering which may be used before the optical power in the individual cores either leaks out of the core or begins to couple into adjacent cores. Taper ratios of only about 3 are possible before this occurs, allowing only a modest improvement in brightness through tapering. There exists a need in the art for an all-fiber approach which can provide close spacing or high density of multiple cores. High packing density can enable additional applications which are not possible with sparse core spacing.

In addition to combining of multiple individual beams, there are applications which benefit from splitting of a single beam into multiple beams. This allows a common source such as a high power solid state laser to be used at multiple endpoints. One application of such a device is to illuminate an area from multiple directions using a common source, such as for medical therapeutics in cancer treatment. In such situations, again, the individual cores in the bundle should have as tight a packing density as possible to capture as much optical energy as possible from the singe multimode core at the tapered end of the device.

SUMMARY OF THE INVENTION

An all-fiber laser combiner has been developed that overcomes at least in part some of the drawbacks of prior art combiners. In one embodiment, a two-section combiner is employed. A first tapered section comprises a "bundle" of input fibers, preferably single or few mode fibers, bundled together. In an alternate embodiment, the bundle of the first section is a group of cores previously coupled or fused together. Another aspect of this embodiment includes using a multicore fiber within the first tapered section. This input bundle is coupled at a first end to a plurality of lasers or other optical sources that produce the optical power to be combined. With suitable design of the multiple cores, it is possible to achieve a taper ratio of at least 3, and preferably a ratio of at least 10, while maintaining a low NA along the length of the first tapered section and, further, preventing interaction between modes of the separate cores as well as preventing interaction between the modes and the outer boundary of any cladding surrounding the cores. The tapered end of the first tapered section could then couple to an output fiber, or alternatively, an amplifier, or any other element used for concentrated high power light.

A further aspect of this embodiment includes coupling the tapered end of the first section to a second bundled section, which also may be tapered, comprising a bundle of multimode fibers or cores to provide further size reduction of the propagating beam. An output end of this second tapered bundle could then couple to an output fiber.

A further aspect of the invention is that the device described above can be operated in the reverse, with the optical source launched into the single tapered end of the first section or the second section. In this instance, the optical power is split into the multiple individual cores at the untapered end.

Yet another aspect of the invention takes advantage of the high optical density in the combiner to create a single supermode output rather than a multiple-moded output. In that instance, if the input modes have an appropriate phase relationship, they can combine constructively to form or excite a single mode of the output waveguide which can convert to a fundamental mode.

BRIEF DESCRIPTION OF THE DRAWINGS

The invention may be more easily understood with the aid, of the drawing wherein:

FIG. 8 is an illustration of an embodiment wherein the second tapered section is implemented using an overclad tube; and FIG. 9 illustrates an embodiment wherein the first and second tapered stages are combined using a single taper.

DETAILED DESCRIPTION OF THE INVENTION

Figure 1:
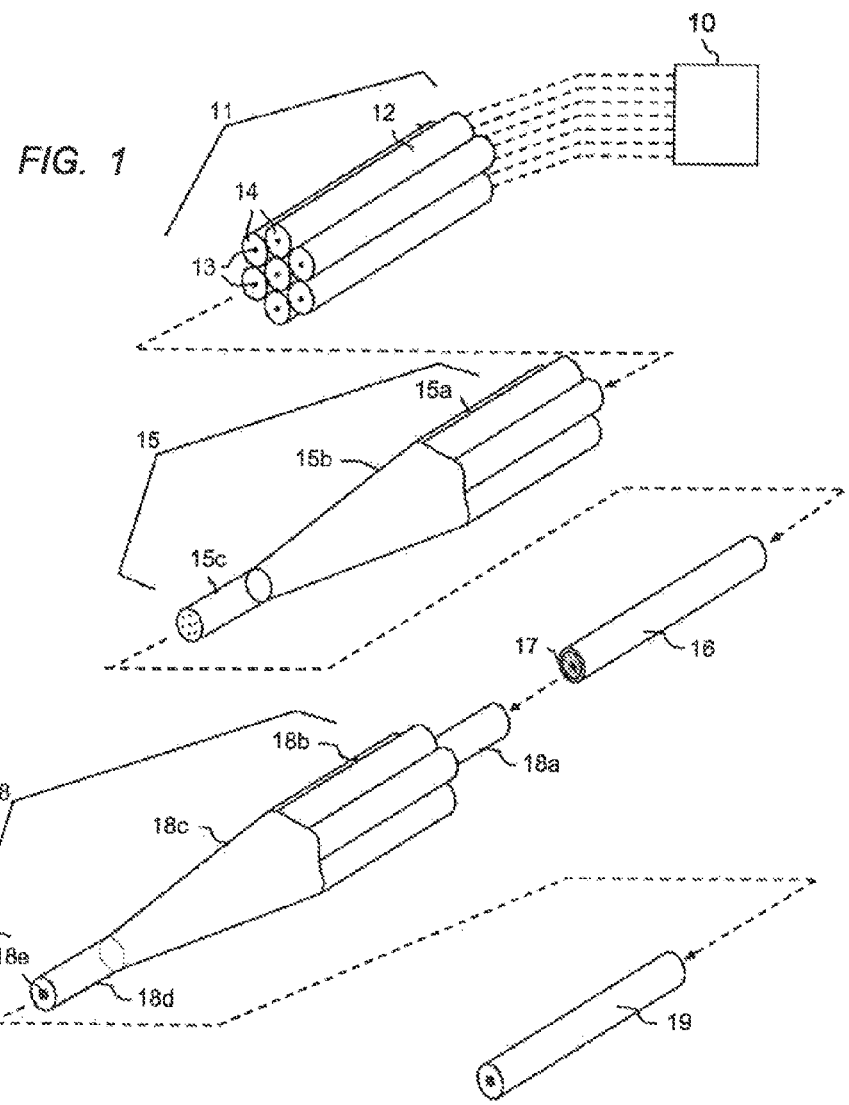
FIG. 1 depicts an all-fiber laser combiner device in accordance with an embodiment of the present invention.

Referring to FIG. 1, an array of lasers is shown at 10. In the illustration shown here, as an example, seven lasers are shown and the laser combiner is designed to combine the outputs from these seven lasers into a single high power source. As this embodiment is but one example of the scope of this invention, the number of laser sources being combined may vary widely. A laser combiner according to the invention will combine at least two laser outputs using at least two tapered fibers. More preferably, the number of sources or fibers is between 5-30. As one objective of the present invention is to produce a high power source, the lasers 10 are typically high power lasers. In an all-fiber implementation, the lasers 10 can be rare earth doped optical gain fibers, for example, Ytterbium doped gain fibers. However, any suitable array of laser sources may be used. Referring again to FIG. 1, the lasers 10 are shown schematically coupled to an array 11 of delivery fibers 12. Each fiber 12 in the array 11 has a core 13 and a cladding 14. They may be individual optical fiber pigtails, or an array of optical fibers organized in a bundle as shown. In an alternate embodiment, array 11 can be a unitary multicore optical fiber. An output end of the array 11 couples the output of the lasers to an input first stage 15 of the combiner. The array 11 is shown as a separate element in FIG. 1 to convey the feature that any suitable form of an array of lasers may be combined using the optical fiber combiner of the invention. Alternatively, the light source could be any source that can couple light into a waveguide.

A first stage 15 of the laser combiner includes a tapered section. An array of optical fibers transmitting primarily fundamental mode light are arranged in a bundle 15a as shown. The fibers made be singlemoded or few-moded. Alternatively, the bundle of fibers could be replaced with a single glass substrate encasing an array of waveguides. Each of the cores of these optical fibers within bundle 15a align with the respective cores of array 11. Thus, in FIG. 1, the bundle 15a comprises seven singlemoded or few-moded fibers to correlate with the seven delivery fibers 12. The optical fibers 15a are shown arranged in a hexagonal close-packed configuration, a configuration convenient for a bundle of seven fibers. However, any suitable bundle configuration may be used. The input fiber bundle 15a is drawn to a taper, as shown at 15b. This results in a portion 15c where the overall outside diameter of the bundle is significantly reduced. With proper core design as described herein, achieving a taper ratio of at least 3, and preferably greater than 10, allows for the light to remain guided in the core along the length of the first tapered stage 15, while maintaining a low NA. Using a pedestal fiber in the bundle 15a as described below is preferable to a conventional step-index fiber. When an optical fiber is tapered, the ratio of the diameter of cladding to the diameter of the core remains approximately constant. In the first tapered stage 15, the optical power throughout the taper 15 propagates as seven isolated mode envelopes such that the there is no intercoupling between the optical modes. Additionally, interaction between the optical modes and the outer boundary of the cladding interface is to be avoided. Preserving isolation between the modes propagating in the individual cores avoids unwanted mode interactions. This is achieved by tapering the bundle to the point where the cores of the individual optical fibers are reduced substantially, but prior to the point where the modes of the individual cores overlap to a degree that would induce significant interaction. Thus, at the output of the first tapered stage 15, the cores of the individual optical fibers 15a continue to be discrete and separate from one another.

The output of the first tapered section 15 forms a high brightness source that could be coupled directly to a multimode fiber and used as a laser combiner alone, wherein "high brightness" represents that the modes propagating in the individual cores have low NA, and the physical spacing between the cores is small. Alternatively, and as shown in FIG. 1, a second tapered fiber section can be added to provide further size reduction.

The first tapered section 15 achieves a level of optical beam concentration that is useful in and of itself. Delivery of such a beam to a work surface can be used for cutting, welding and marking, for example. The high beam concentration can also enable creation of a single supermode output rather than a multiple-moded output. In that instance, if the input modes have an appropriate phase relationship, some or all of the inputs can combine constructively to form or excite a single mode of the output waveguide which can convert to a fundamental mode either in the tapered section or in a waveguide coupled to the tapered section. This can be accomplished, by monitoring the characteristics of the output beam and actively controlling the phases of the source lasers. In other embodiments, the first tapered section is used in combination with other expedients to provide additional functionality, for example, combined with a second tapered section as shown in FIG. 1. Output 15c of the first tapered section 15 is coupled to a multimode fiber 16, which in turn is coupled to an input fiber 18a of a second tapered section 18. The multimode fiber 16 can be a large mode area fiber, sufficient to capture the outputs from the multiple cores 15c.

Second tapered section 18 includes a second bundle of fibers 18b, shown arranged in a configuration similar to the bundle 15a. Fibers 18b may have light guiding cores but preferably do not. As shown, fibers 18b are arranged around central optical fiber 18a, which is a multimode optical fiber with a light guiding core. The output from the first tapered section 15 is introduced into the core of optical fiber 18a through coupling fiber 16 previously described.

It is evident that multimode core 17 contains essentially all the power from the array of laser or other optical sources. Multimode core 17 is significantly reduced in size in the multimode taper 18c, such that the optical energy in the multimode core 17 is now confined in small multimode core 18e. When the multimode fiber 18a is then drawn to a final diameter in output section 18d, the amount of cladding may no longer be sufficient to splice to the delivery optical fiber 19. Accordingly, an important function of the multimode tapered section 18, is to add cladding to the outside of the reduced multimode core. As the taper is drawn, and the fiber size diminished, cladding is added. Thus in the multimode tapered, section 18, the ratio of cladding, diameter to core diameter increases, so that the ratio at the end of the multimode tapered section 18c, is substantially greater than the ratio at the beginning of the multimode tapered section 18c.

Recognizing the function of the added glass material in the fiber bundle 18b, i.e. to add cladding, it is now evident that the optical fibers in the bundle 18b may not necessarily have cores. That is, the fibers in bundle 18b may be simple undoped silica fibers. They may be down-doped (e.g., fluorine-doped) if desired to produce more effective cladding. Such added cladding can be provided in several alternative ways. One of those is to use an overclad tube, similar to the approach used for making optical fiber preforms, except that the overclad glass tube in this case is small, similar to a capillary tube. This approach will be described in more detail below. Accordingly, it is to be understood that bundle 18b in FIG. 1 represents added glass in whatever form chosen. The added glass may be referred to as "supplemental cladding". It can be identified by a significant increase in the cladding diameter to core diameter ratio when comparing the end of output fiber 15c to the end of output fiber 18d, or the end of fiber 16 to an end of fiber 19. The increase may be greater than, for example, 10%, and is easily recognized since under normal circumstances when drawing an optical fiber the cladding to core ratio will not increase. In a particular embodiment, the increase is more likely to be greater than 300%.

Summarizing some of the characteristics of the beam combiner shown in FIG. 1, it is preferred that they include some combination of the following: (1) The mode size of the input fiber is selected to provide both single or few-mode operation and large area for high power; (2) The core waveguide used in the first tapered section is of a design, for example, a pedestal design, that allows for large tapering factors while preserving confinement of the mode within the core; and (3) The tapering fiber cladding size of the fibers in the first tapered section is selected to insure that the optical energy remains isolated within the core waveguide throughout the first tapered section.

Figure 2:
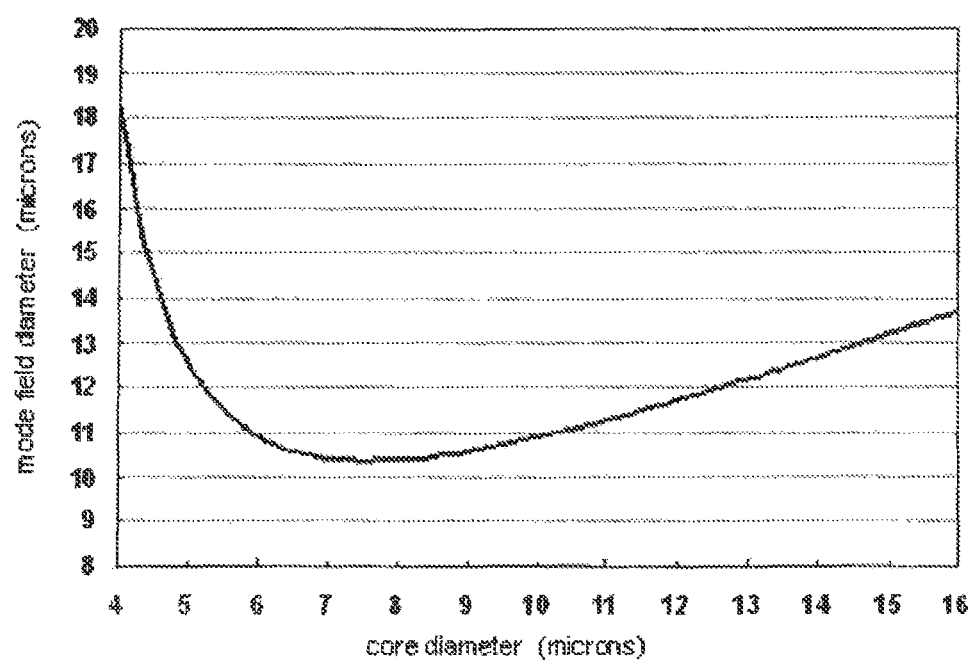
FIG. 2 is a plot of mode field diameter vs. core diameter showing a useful range for input optical fibers.

The mode size of the input fibers is selected to provide both single or few-mode operation and also large area for high power. For wavelengths in the 1000+/−200 nm regime, a range of 8 to 20 micrometers is recommended to achieve this. FIG. 2 is a plot of mode field diameter in microns vs. core diameter in micrometers for a conventional step index fiber, having a numerical aperture (NA) of 0.08, operating at 1060 nm. For single or few mode operation with a large area, a core size of approximately 10 microns is typically used. With reference to the curve in FIG. 2, this sets the optimum mode size at approximately 11 microns.

Figure 3:
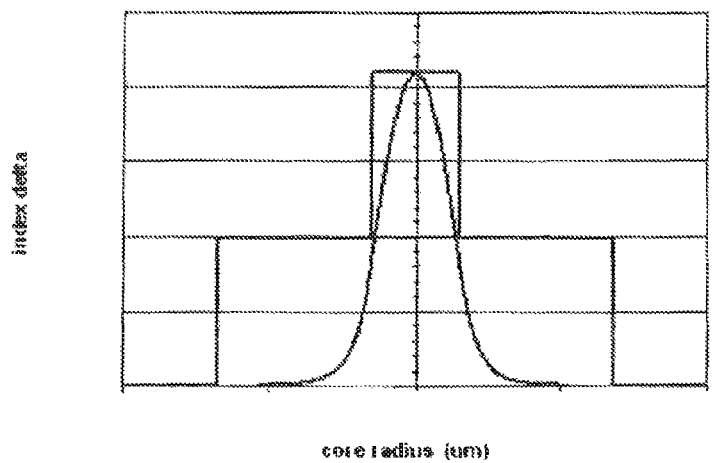
FIGS. 3 and 4 are plots for pedestal type optical fibers, advantageously used in laser combiners, showing refractive index profiles and corresponding mode fields before and after tapering.
Figure 4:
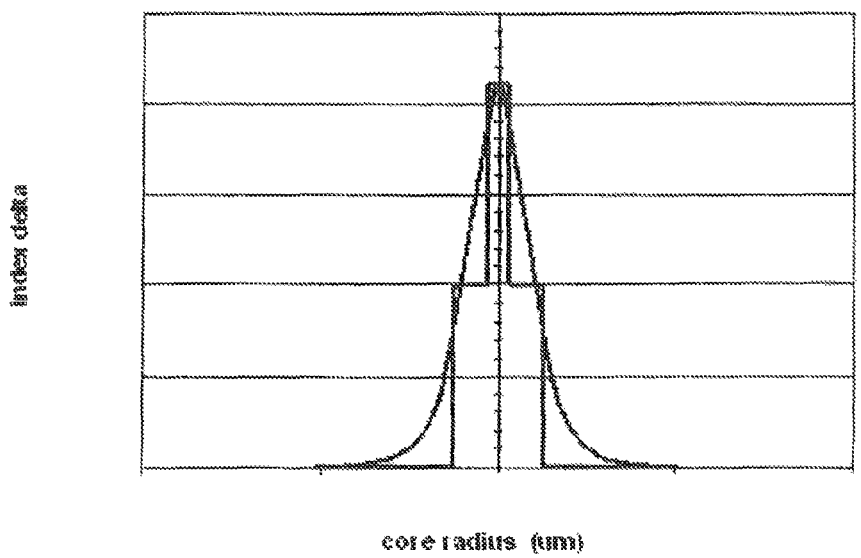

It is preferred that the cores of the first stage tapering fibers be designed so that the propagating light remains guided and confined to low order modes throughout the first stage tapered section. Ultimately, the preferred core design will ensure a near constant mode field diameter even for the largest degree of tapering. An optical fiber with a pedestal index profile is preferred for this purpose, although other fibers, such as a fiber with a step-index core can be used. For example, a pedestal diameter of at least 5.times. the core diameter is preferred a taper ratio of 6. FIGS. 3 and 4 show refractive index profiles and corresponding fundamental mode fields (curves) for a pedestal type fiber before (FIG. 3) and after (FIG. 4) tapering. The mode field is reasonably well contained in the optical fiber core even after significant tapering. The taper ratio illustrated between FIGS. 3 and 4 is of the order of 5. As stated previously, a taper ratio of at least 3 is required for creating high energy density of the combiner.

A pedestal type optical fiber may be described, in general, as having a core with a refractive index profile containing a shelf. The core and the shelf may be built into an alpha profile or a step profile. In the latter case the overall index profile has two steps, as shown in FIG. 3.

Figure 5:
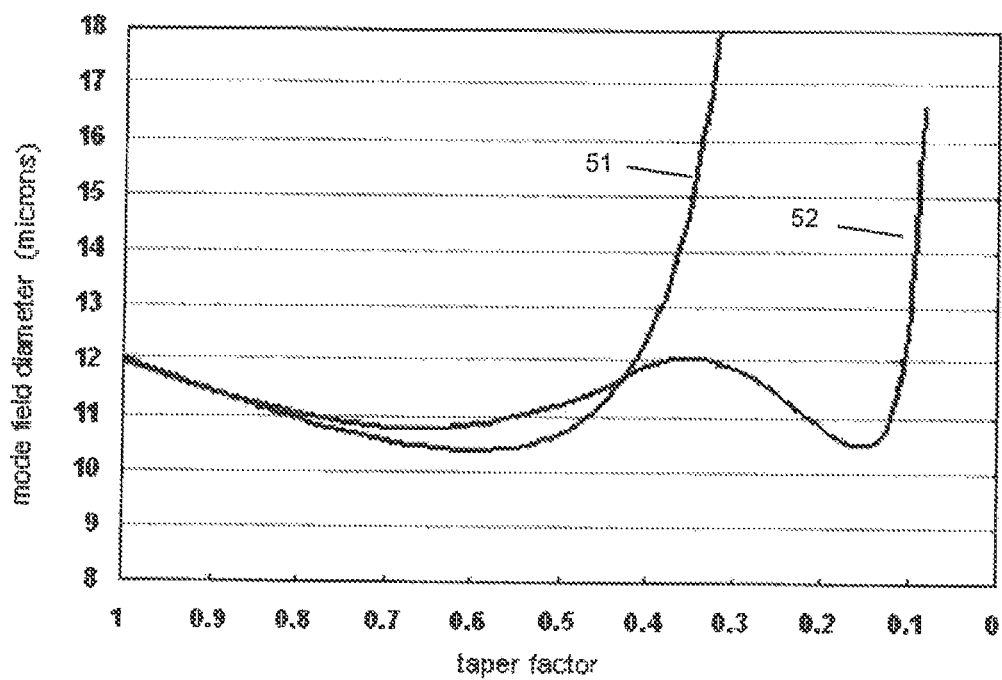
FIG. 5 is a plot of mode field diameter vs. taper factor illustrating an advantage of a pedestal type optical fiber over a conventional step index optical fiber.

FIG. 5 shows mode field diameter, as a function of the taper ratio, comparing a standard step index fiber (curve 51) and a pedestal type fiber (curve 52). Whereas the step index fiber maintains a relatively confined mode field over a taper ratio of 2.5 (factor of 0.4), the pedestal type fiber maintains a relatively confined mode field over a taper ratio of nearly 10 (factor of 0.1). (The taper ratio is 1/taper factor.) However, even with a fundamental mode propagating in a well designed pedestal type fiber, as the fiber is tapered, the mode size (mode field diameter MFD) in each fiber will enlarge significantly and may couple to propagating modes in adjacent cores within the bundle and/or to interact with the interstitial fused fiber boundaries. To avoid that, the initial cladding size of the tapering fibers may be designed to be large enough to provide isolation of the mode throughout the tapering length. Not only will that prevent modes of adjacent fibers from interacting, it will help avoid attenuation of the light in the waveguide from external effects at the fused boundaries. Thus attention should be given to the thickness of the buffered cladding in the tapered state at the end of the first stage. However, excess cladding beyond that needed for isolation should be avoided as that would increase the spacing between cores and reduce the energy density of the combiner, the opposite of the goal.

Figure 6:
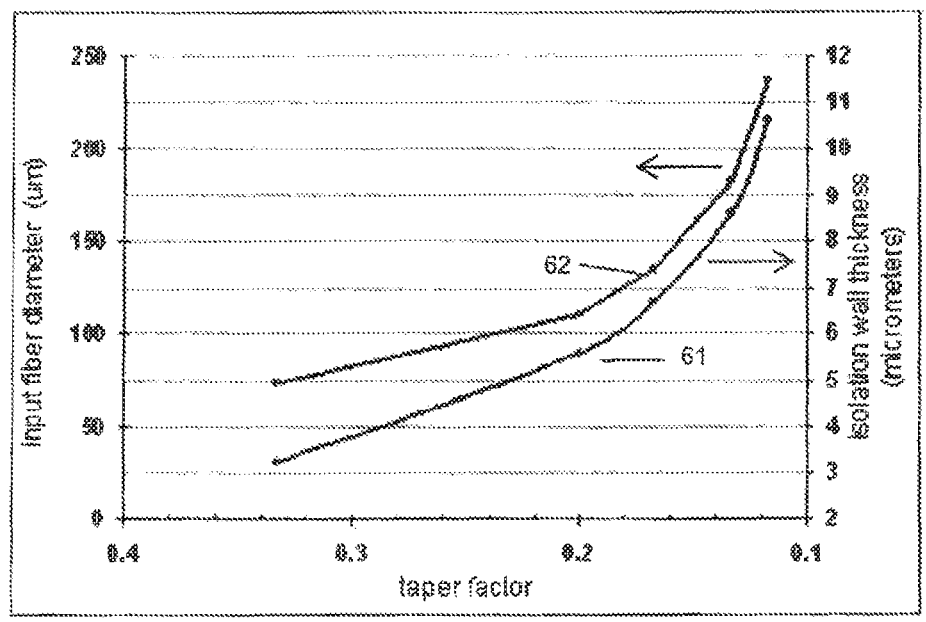
FIG. 6 is a plot relating wall thickness and optical fiber diameter to the taper factor.

FIG. 6 illustrates these effects. Curve 61 indicates the manner in which increasing wall thickness (separation between cores) is needed to isolate the mode fields in the multiple fibers. That is, "isolation wall thickness" is the radius of the cladding of one of the input fibers (for example, a fiber in bundle 15a as shown in FIG. 1) after tapering. The required wall thickness after tapering ultimately determines the size of the initial fibers. This is shown by curve 62. It can be seen that for maximum tapering of the multiple fiber bundle in the embodiment described above, the optical fibers should have an initial diameter of approximately 200 micrometers. The wall thickness should be greater than 8 micrometers. The taper itself should be designed to deliver a low numerical aperture, often captured in the beam parameter product or BPP in units of mm-mrad. Since the tapering process can possibly lead to leaked light from the core and this light will fill the larger diameter of the group of bundled fibers, it is preferred to form the first stage taper with only the tapering fibers that carry the light being concentrated, i.e., added non-essential glass adds unnecessary and unwanted cross sectional area to the concentrator.

Figure 7:
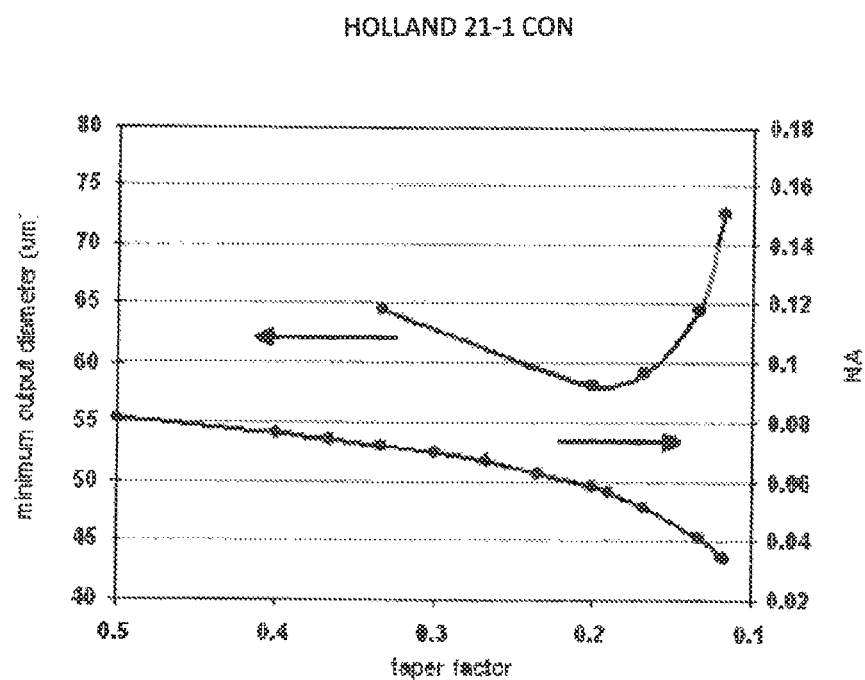
FIG. 7 is a plot showing preferred taper factors to minimize the product of diameter and divergence.

Another concern is that large tapering will result in lower NA of the light exiting the single-mode cores, but that greater diameter will be needed on the output fiber to capture the light. As shown in FIG. 7, there will be an optimum taper factor to minimize the product of diameter and divergence.

Regarding the single or few-mode tapered section, both the bundle size and reduction factor of the single or few-mode taper are preferably selected to maintain a low beam parameter product (BPP).

The multimode tapered section is designed to further reduce the core size while also adding glass area for splicing, without significantly changing the BPP. To account for thermal management, fiber coatings and packaging are preferably designed to reduce heating.

Further, backward power management may be accounted for by designing the length, distributed nature, and outer bundle fibers so as to minimize the impact of large powers reflected back into the combiner, for example by reflections from the illuminated work surface. In some instances it is desirable to operate the device in such a reverse fashion, in which case a single optical source is used to launch light into the tapered or multimode end of the device, with such light being split approximately uniformly into the individual cores in array 11.

In applications where maintaining the optical power at a given level is strictly required the laser combiner may be operated with fewer than all available sources, at least one source being reserved as a spare. Upon failure of a laser source the spare source is activated. This expedient is easily automated so that the desired power level is maintained essentially without interruption.

Reference is made herein to single and few-mode fibers, and multimode fibers. Typically single mode and few mode fibers will have a core less than 20 micrometers, and multimode fibers will have a core diameter greater than 50 micrometers. Exceptions may be found. Whether an optical fiber is single or few-mode, or is multimode is easily determined by those skilled in the art. For the purpose of definition, the term few mode optical fiber when used in the context of the invention includes optical fibers that propagate single modes. Single mode fibers typically propagate more than 50% and typically more than 90% of the propagating optical energy in a fundamental mode.

Reference made herein to the cladding of an optical fiber is intended to mean cladding in the conventional sense, i.e., glass material formed integrally around the guiding region of an optical fiber. When reference is made to the core of a core guided optical fiber, that term is generally construed as meaning the region where 90% or more of the optical energy is confined.

Reference made herein to the cladding/core ratio means the ratio of the radius or the diameter of the cladding to the radius or the diameter, respectively, of the core. When a group of three or more optical fibers having a first cladding/core ratio is tapered, and additional cladding is added using any of the embodiments described herein, the clad/core ratio of the optical fiber in the after taper section will typically be larger than the first cladding/core ratio.

As described above, the laser combiner of the invention is intended primarily for use with high power laser sources to produce a very intense high power source. In this kind of product the output optical power density may be expected to accommodate >100 kW within a <100 micrometer fiber.

The invention is illustrated in an embodiment described above with two optical fiber tapered sections. The second optical fiber tapered section serves to provide supplemental cladding and core diameter reduction. The function of both sections may be achieved in a single tapered section or more than one tapered section.

A variety of methods may be devised to manufacture the laser combiner assembly just described. Typically, the tapered sections will be formed in separate operations, then, in a suitable sequence, the single or few-moded fiber tapered section is coupled to the lasers and the multimode fiber tapered section is coupled to the single mode fiber tapered section.

Referring again to the function of the second optical fiber bundle as providing additional glass around the body resulting from drawing the first tapered section, a preferred alternative for reaching that goal is illustrated in FIG. 8, where the elements 84 and 85 correspond to the end 15c of the first tapered section of FIG. 1, or to the multimode coupling section 16 of FIG. 1. For ease of fabrication the latter choice would appear more likely and will be assumed as the element 84, 85 for the description of FIG. 8. The multimode optical fiber 84 is inserted within a cladding tube 83, corresponding to the fiber bundle 18b of FIG. 1. The combination is drawn to a taper as described earlier in connection with the second tapered section. The glass tube 83 may have any suitable dimensions depending on the amount of cladding to be added. The cladding, tube 83 may be a glass tube used to make a waveguide. Common methods include doping with fluorine, using one or more rings of airholes, or glass containing voids. It may have multiply-doped layers, for example, a fluorine doped inner layer and a silica outer layer. Although the embodiments described herein, the invention is not limited to silica but encompasses other types of glass such as phosphate, chalcogenide, and the like.

Another embodiment of the invention is illustrated in FIG. 9, where the functions of the two tapered seconds described above are realized using a single taper. In FIG. 9 the optical fibers 91 correspond to the optical fibers 13 of FIG. 1. The glass overclad tube corresponds to the fiber bundle 18b of FIG. 1, or to the cladding tube 83 of FIG. 8. The combination of these elements is drawn in a single taper operation to produce a taper 93a, output end 94 with reduced diameter, and core 95 which is the common core for the seven optical fiber cores being combined.

Alternatively, the supplemental cladding represented by cladding tube 83 may be provided in the manner described in conjunction with FIG. 1, i.e., by optical fiber bundle 18b. In either case, the supplemental cladding is provided by encasing a plurality of few mode optical fibers in supplemental cladding material, either in the form of a cladding tube or in the form of a bundle of optical fibers. Combinations of these may also be used.

Applications using the beam combiner include forming high power lasers for cutting, welding, and marking applications, providing pump power for operating a laser or amplifier, the phase of individual inputs could be controlled to generate a coherently combined output beam, or the inputs could be multiple wavelengths. Furthermore, the device may be applied to telecommunications systems in which the optical sources are signal sources and the multiple signals are multiplexed onto a single multimode fiber for transmission over short distances, for example for interconnection between microprocessor chips or electronics boards, or over longer distances, such as between central offices or as part of a broadband fiber network.

Applications of the use of the device as a power splitter include medical applications in which light from a common source is delivered to multiple fibers to illuminate an area from multiple directions. For telecommunications applications, the combined signals can be split and delivered to multiple destinations or detectors. In a further application, the individual arms of the power splitter can be coupled to photoelectric cells so that a single common optical energy source can be split and delivered to multiple destinations where the optical energy is converted to electrical energy.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. A method of manufacturing a combiner device comprising:
    positioning an plurality of fibers into a bundle of fibers, each fiber having a core and a cladding;
    drawing the bundle of fibers to create a tapered section, the tapered section having a first outer diameter at an input end, a second outer diameter at an output end, and a taper ratio of greater than or equal to ten, the taper ratio defined by the first outer diameter divided by the second outer diameter;
    coupling a multi-mode fiber to the output end of the tapered section;

creating a second tapered section utilizing at least the multi-mode fiber, wherein the second tapered section comprises a plurality of fibers; and providing an additional cladding layer surrounding the multi-mode fiber;

wherein at least one of the fibers of the bundle of fibers comprises an optical waveguide configured for propagating an optical mode from the input end to the output end, and wherein a mode field diameter of the optical mode at the input end is substantially the same as the mode field diameter at the output end.

2. The method of manufacturing a combiner device of claim 1, wherein a numerical aperture of the optical mode at the input end is substantially the same as a numerical aperture of the mode at the output end.

3. The method of manufacturing a combiner device of claim 1, wherein the at least one of the fibers comprises a core having a pedestal structure therein.

4. The method of manufacturing a combiner device of claim 1, wherein the additional cladding layer is provided by a plurality of low-index fibers surrounding the multi-mode fiber.

5. The method of manufacturing a combiner device of claim 1, wherein the additional cladding layer is provided by surrounding the multi-mode fiber in a cladding tube.

6. The method of manufacturing a combiner device of claim 1, wherein each of the plurality of fibers a plurality of the cores comprise an optical waveguide configured for propagating an optical mode from the input end to the output end.

7. The method of manufacturing a combiner device of claim 1, wherein the combiner is an all-fiber structure.

8. A method of manufacturing a combiner device comprising:

drawing a first bundle of fibers to create a first tapered section, each fiber of the first bundle of fibers having a core and a cladding;

drawing a second bundle of fibers to create a second tapered section, each fiber of the second bundle of fibers having a core and a cladding;

each of the first and second tapered sections having a first outer diameter at an input end, a second outer diameter at an output end, and a taper ratio greater than or equal to ten, the taper ratio defined by the first outer diameter divided by the second outer diameter;

coupling a multi-mode fiber to the output end of the tapered section and the input end of the second tapered section; and providing an additional cladding layer surrounding the multi-mode fiber;

wherein at least one of the fibers of each of the first and second bundle of fibers comprises an optical waveguide configured for propagating an optical mode from the input end to the output end, and wherein a mode field diameter of the optical mode at the input end is substantially the same as the mode field diameter at the output end.

9. The method of manufacturing a combiner device of claim 8, wherein a mode field diameter at the input end of each of the first tapered section and second tapered section is substantially the same as the mode field diameter at the output end.

10. The method of manufacturing a combiner device of claim 9, wherein a numerical aperture of the mode at the input end of each of the first tapered section and second tapered section is substantially the same as a numerical aperture of the mode at the output end.

11. A method of manufacturing a combiner device comprising:

drawing a multi-core preform structure to create a tapered section, the tapered section having a first outer diameter at an input end, a second outer diameter at an output end, and a taper ratio of greater than or equal to ten, the taper ratio defined by the first outer diameter divided by the second outer diameter;

coupling a multi-mode fiber to the output end of the tapered section;

creating a second tapered section utilizing at least the multi-mode fiber, wherein the second tapered section comprises a plurality of fibers; and providing an additional cladding layer surrounding the multi-mode fiber;

wherein at least one of the cores of the multi-core preform structure comprises an optical waveguide configured for propagating an optical mode from the input end to the output end, and wherein a mode field diameter of the optical mode at the input end is substantially the same as the mode field diameter at the output end.

12. The method of manufacturing a combiner device of claim 11, wherein a numerical aperture of the optical mode at the input end is substantially the same as a numerical aperture of the mode at the output end.

13. The method of manufacturing a combiner device of claim 11, wherein the at least one cores of the multi-core preform structure comprises a pedestal structure therein.

14. A method of manufacturing a combiner device comprising:

drawing a first bundle of fibers to create a first tapered section, each fiber of the first bundle of fibers having a core and a cladding and a taper ratio of greater than or equal to ten;

inserting a tapered end of the first tapered section into a cladding tube of a second bundle of fibers;

drawing the combination of the tapered end of the first tapered section and the second bundle of fibers to create a second tapered section;

wherein the tapered end of the first tapered section comprises a multimode fiber;

wherein the cladding tube comprises a glass tube waveguide; and wherein the glass tube waveguide comprises at least one cladding layer, the cladding layer selected from the group of fluorine doping, one or more rings of airholes, or glass containing voids.

15. The method of claim 14, wherein the glass tube waveguide comprises multiply-doped layers.

16. The method of claim 15, wherein the multiply-doped layers comprise a fluorine doped inner layer and a silica outer layer.

* * * * *